(12) United States Patent
Laaser et al.

(10) Patent No.: US 8,150,161 B2
(45) Date of Patent: Apr. 3, 2012

(54) TECHNIQUE FOR CORRECTING CHARACTER-RECOGNITION ERRORS

(75) Inventors: William T. Laaser, Palo Alto, CA (US); Rajalakshmi Ganesan, Los Altos Hills, CA (US); James A. Schneider, Mountain View, CA (US)

(73) Assignee: Intuit Inc.

( * ) Notice: Subject to any disclaimer, the term of this patent is extended or adjusted under 35 U.S.C. 154(b) by 863 days.

(21) Appl. No.: 12/235,463

(22) Filed: Sep. 22, 2008

(65) Prior Publication Data
US 2010/0074509 A1 Mar. 25, 2010

(51) Int. Cl.
*G06K 9/03* (2006.01)
*G06K 9/62* (2006.01)

(52) U.S. Cl. .......... 382/186; 382/187; 382/310

(58) Field of Classification Search .......... None
See application file for complete search history.

(56) References Cited

U.S. PATENT DOCUMENTS

| 5,850,480 A | * | 12/1998 | Scanlon | 382/229 |
| 2007/0172124 A1 | * | 7/2007 | Withum et al. | 382/181 |

FOREIGN PATENT DOCUMENTS

| EP | 0923043 A1 | 12/1997 |
| GB | 2434477 A | 7/2007 |

* cited by examiner

*Primary Examiner* — Brian Werner

(74) *Attorney, Agent, or Firm* — Park, Vaughan, Fleming & Dowler LLP; Steven E Stupp

(57) ABSTRACT

Embodiments of a computer system, a method, and a computer-program product (e.g., software) for use with the computer system are described. These embodiments may be used to identify and correct errors in financial information that was extracted using character-recognition software, such as optical character recognition software and/or intelligent character recognition software. In particular, potential errors may be identified by comparing the financial information for a current financial transaction of a user with expected financial information from one or more previous financial transactions of the user. Error metrics for these potential errors may be determined and used to correct at least some of the potential errors. For example, values of the Levenshtein edit distance may be determined based on the comparison, and one or more potential errors associated with one or more minimum values of the Levenshtein edit distance may be corrected.

21 Claims, 5 Drawing Sheets

FINANCIAL INFORMATION
110

PAYOR: INDUSTRIAL TECHNOLOGIES

PAYEE: INTERMET SERVICE PROVIDER

ADDRESS: 1169 SPRINGFIELD RD.
SOUTH BEMD, ID 46601

AMOUNT: $681.33

DATE: SEPTEMBER 9, 2008

ERRORS
114

EXPECTED FINANCIAL INFORMATION
112

PAYOR: INDUSTRIAL TECHNOLOGIES

PAYEE: INTERNET SERVICE PROVIDER

ADDRESS: 1169 SPRINGFIELD RD.
SOUTH BEND, ID 46601

TECHNIQUE FOR CORRECTING CHARACTER-RECOGNITION ERRORS

BACKGROUND

The present invention relates to techniques for correcting errors that can occur when performing character-recognition operations on documents.

Character-recognition techniques are widely used to extract information in documents by converting data in an initial format (such as bitmap) into another format (such as ASCII). For example, optical character recognition (OCR) is often used to convert printed text to corresponding digital values, and intelligent character recognition (ICR) is often used to convert handwritten text to corresponding digital values.

Unfortunately, the conversion performed by most character-recognition techniques is not perfect, and there is always a finite probability of errors. These errors can significantly complicate and increase the expense of subsequent processing of the extracted information.

SUMMARY

One embodiment of the present invention provides a computer system that corrects errors in financial information. During operation the computer system receives financial information associated with a financial transaction. This financial information was previously extracted using character-recognition software, such as optical character-recognition (OCR) software and/or intelligent character-recognition (ICR) software. Then, the computer system retrieves expected financial information for a user associated with the financial transaction. Next, the computer system identifies potential errors in the received financial information by comparing the received financial information with the expected financial information and aggregating one or more error metrics. Moreover, the computer system corrects the received financial information based on an aggregate error metric for one or more potential errors in the received financial information.

Note that the expected financial information may be included in a financial history of the user (such as one or more previous financial transactions). For example, the financial history may include: a list of customers, customer addresses, a list of vendors, vendor addresses, an inventory, or invoices of the user. Moreover, the financial history may be associated with financial software.

Additionally, the financial transaction may be associated with a negotiable instrument, such as a check. Moreover, the financial information may have been determined from a scanned receipt or the check.

A given aggregate error metric in the one or more aggregate metrics may include a Levenshtein edit distance between characters in the received financial information and characters in the expected financial information. Moreover, different weights may be used for different potential errors when determining the given aggregate error metric. For example, a potential error having a low probability (based on the types of errors that typically occur when using the character-recognition software) may be assigned a high weight. These different potential errors may be associated with different operations, such as: character insertion, character deletion, character substitution, and/or character transposition. In some embodiments, the aggregate error metric corresponding to the one or more potential errors is an extremum value of the aggregated error metrics (such as the lowest Levenshtein edit distance).

In some embodiments, the computer system receives feedback regarding the corrected financial information, and modifies the process of identifying potential errors in subsequently received financial information based on the feedback.

Another embodiment provides a method including at least some of the above-described operations.

Another embodiment provides a computer-program product for use in conjunction with the computer system.

BRIEF DESCRIPTION OF THE FIGURES

FIG. 1 is a drawing illustrating a comparison of financial information that is determined using character-recognition software and expected financial information in accordance with an embodiment of the present invention.

Figure 2:
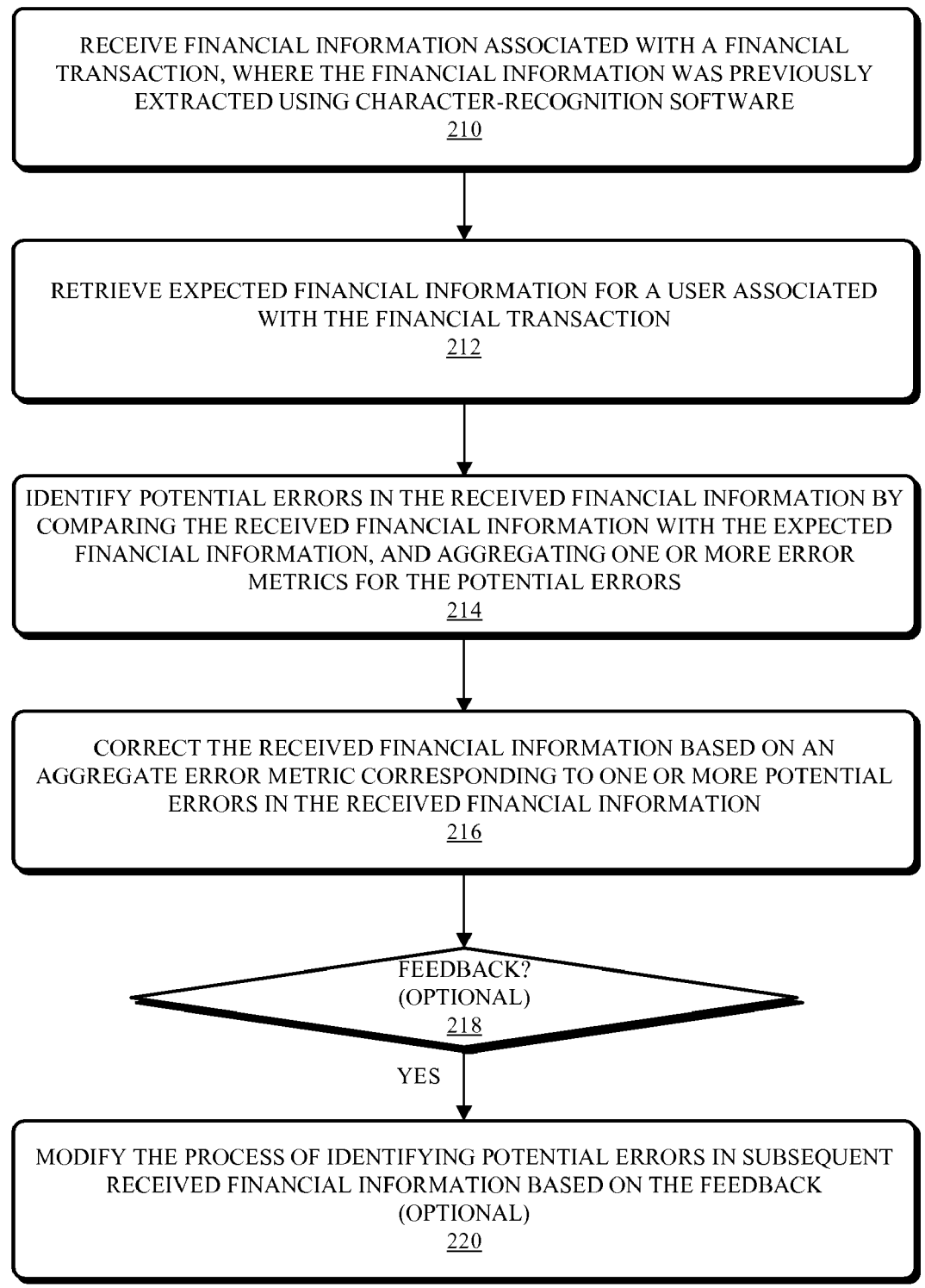
FIG. 2 is a flow chart illustrating a process for correcting errors in financial information in accordance with an embodiment of the present invention.

Table 1 provides characteristic errors for optical character-recognition software and associated weights that can be used when determining error metrics by comparing financial information and expected financial information.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (e.g., software) for use with the computer system are described. These embodiments may be used to identify and correct errors in financial information that was extracted using character-recognition software, such as OCR software and/or ICR software. In particular, potential errors may be identified by comparing the financial information for a current financial transaction of a user with expected financial information from one or more previous financial transactions of the user. Error metrics for these potential errors may be determined and used to correct at least some of the potential errors. For example, values of the Levenshtein edit distance may be determined based on the comparison, and one or more potential errors associated with one or more minimum values of the Levenshtein edit distance may be corrected.

By identifying and correcting potential errors in the financial information, this error-correction technique may increase the reliability of information extracted using character-recognition software (i.e., may reduce the probability of errors). This improved reliability may reduce the complexity and the expense of subsequent processing of the financial information.

We now describe embodiments of a process for correcting errors in financial information. FIG. 1 presents a drawing 100 illustrating a comparison of financial information 110 that is determined using character-recognition software and expected financial information 112. This financial information may be associated with a financial transaction of a user. For example, the financial transaction may have been conducted using a negotiable instrument (such as a check), and the financial information may have been obtained by performing character recognition on a scanned check. Alternatively, the financial transaction may have been conducted using a credit or a debit card, and the financial information may have been obtained by performing character recognition on a scanned receipt.

Unfortunately, character-recognition software, such as OCR software and ICR software, has a finite probability of producing errors 114 in the financial information 110. As described below with reference to FIG. 2, these errors may be identified and corrected by comparing the financial information 110 with the expected financial information 112, which may be determined based on one or more previous financial transactions conducted by the user. For example, the financial transaction may be a routine payment to a vendor, in which case comparisons with one or more previous payments to the vendor may be used to identify and correct the errors 114. In particular, potential errors in the financial information 110 may be identified by calculating Levenshtein edit distances for differences between the financial information 110 and the expected financial information 112, and one or more potential errors associated with a minimum value (or a range of minimum values) of the Levenshtein edit distance may be corrected.

Note that the expected financial information, such as financial information from one or more previous financial transactions, may be stored in a financial history of the user. Moreover, the financial history may be associated with financial software, such as payroll or accounting software, which is routinely used by the user.

In the discussion that follows, OCR should be understood to include mechanical or electronic conversion of images of handwritten, typed or printed text (which may be captured by a scanner) into machine-editable text (and, more generally, digital data). Similarly, ICR should be understood to include handwriting-recognition systems that convert fonts and different styles of handwriting into machine-editable text (and, more generally, digital data). While these character-recognition techniques are used as illustrative examples, the error-correction technique may be applied to correct errors in a wide variety of information (including images) that are extracted from documents using pattern-recognition techniques. Furthermore, while the error-correction technique is illustrated using financial information, in other embodiments the error-correction technique is applied to information other than financial information.

Moreover, the Levenshtein edit distance should be understood to include a generalized metric for the difference between two sequences (i.e., it is the so-called edit distance). In particular, the Levenshtein edit distance between two strings may be given by the minimum number of operations needed to transform one string into the other. These operations may include: an insertion of a character (character insertion), a deletion of a character (character deletion), a substitution of a character (character substitution), and/or transposition of two or more characters (character transposition). While the Levenshtein edit distance is used as an illustrative example, a wide variety of error metrics (such as the Hamming distance) may be used to identify and correct potential errors.

FIG. 2 presents a flow chart illustrating a process 200 for correcting errors in financial information, which may be performed by a computer system. During operation the computer system receives financial information associated with a financial transaction (210). This financial information was previously extracted using character-recognition software, such as OCR software and/or ICR software. Then, the computer system retrieves expected financial information for a user associated with the financial transaction (212).

Next, the computer system identifies potential errors in the received financial information by comparing the received financial information with the expected financial information and aggregating one or more error metrics for the potential errors (214). For example, a given aggregate error metric in the one or more aggregate metrics may include a Levenshtein edit distance between characters in the received financial information and characters in the expected financial information. Moreover, different weights may be used for different potential errors when determining the given aggregate error metric. For example, a potential error having a low probability (based on the types of errors that typically occur during the character recognition) may be assigned a high weight. The different potential errors may be associated with different operations, such as: character insertion, character deletion, character substitution, and/or character transposition.

Furthermore, the computer system corrects the received financial information based on an aggregate error metric corresponding to one or more potential errors in the received financial information (216). For example, the aggregate error metric corresponding to the one or more potential errors may have an extremum value of the aggregated error metrics (such as the lowest Levenshtein edit distance).

In some embodiments, the computer system optionally receives feedback regarding the corrected financial information (218), and optionally modifies the process of identifying potential errors in subsequent received financial information based on the feedback (220). In this way, the computer system may adapt or learn which potential errors should be corrected. For example, based on feedback that identifies potential errors that were not corrected during operation 216, the computer system may replace the aggregate metric with a subset of the aggregate metrics. This subset may correspond to a range of Levenshtein edit distances, such as the lowest values of the Levenshtein edit distances.

In an exemplary embodiment, a paper document representing payment to a vendor is scanned and the vendor name, 'Reqles' (the financial information), is extracted using OCR software. Furthermore, assume that expected vendor names (the expected financial information) in a financial history for this user includes 'Pogle's' and 'Cebles.' As shown in Table 1, there may be characteristic errors that occur when using the OCR software. Consequently, the weights shown in Table 1 may be used when calculating the Levenshtein edit distances based on comparisons of the financial information with the expected financial information. In this example, the weight for any other error (such as adding, removing or replacing a character) is 1.0.

TABLE 1

| Characteristic Error | Probability | Weight |
|---|---|---|
| Confuses 'P' with 'R' | High | 0.1 |
| Confuses 'R' with 'C' | Low | 1.9 |
| Confuses 'o' with 'e' | High | 0.1 |
| Confuses 'g' with 'q' | High | 0.1 |
| Confuses 'q' with 'b' | Low | 1.9 |
| Adds or removes an apostrophe | High | 0.1 |

Because the vendor name 'Reqles' is not found in the financial history for the user, comparisons to similar vendor names are performed based on the assumption that one or more errors occurred during the OCR processing. For example, a total of four operations can convert the vendor name 'Reqles' to the vendor name 'Pogle's,' with an aggregate error metric or Levenshtein edit distance (per Table 1) of 0.4. In particular, 'Reqles' can be converted into 'Pogle's' by: replacing 'R' with 'P,' with an error-metric contribution (or weight) of 0.1; replacing 'e' with 'o,' with an error-metric contribution of 0.1; replacing 'q' with 'g,' with an error-metric contribution of 0.1; and adding an apostrophe, with an error-metric contribution of 0.1.

However, the vendor name 'Reqles' can be converted to 'Cebles,' using two operations, with an aggregate error metric or Levenshtein edit distance (per Table 1) of 3.8. In particular, 'Reqles' can be converted to 'Cebles' by: replacing 'R' with 'C,' with an error-metric contribution (or weight) of 1.9; and replacing 'q' with 'b,' with an error-metric contribution (or weight) of 1.9.

Even though more operations are needed to convert the vendor name 'Reqles' to 'Pogle's,' this vendor name is more likely because it has a lower Levenshtein edit distance. Thus, the potential errors in the financial information can be identified (and thus corrected) based on the operations associated with the minimum Levenshtein edit distance (which identifies the potential errors that are more likely to occur during OCR).

Note that if there is no match in the financial history between the received financial information (210) and the expected financial information, and the Levenshtein edit distances determined by comparing the received financial information with the expected financial information exceed a threshold (such as 2.0), it may be assumed that the received financial information is correct. For example, the received financial information may correspond to a financial transaction with a new vendor, which is added to the financial history.

In other embodiments, the character-recognition technique may have a high probability for confusing a '3' with an '8.' Consequently, a low weight may be associated with this operation. However, the character-recognition technique may have a low probability for confusing an 'I' with a 'W,' and hence a larger weight may be associated with this operation. Similarly, different weights may be used for adding or deleting different characters. For example, a low weight may be used for adding or deleting an 'l' and a larger weight may be used for adding or deleting a 'W.' Moreover, the aggregate error metrics may include compound or multiple-character operations. For example, a single low weight may be used for substituting 'vv' for 'w' (instead of including two weights for replacing 'w' with 'v' and then adding another 'v').

In general, the weights may be selected based on the likelihood or probability that the character-recognition technique confuses or makes errors for particular characters. In some embodiments, the weights used may be specific to a given user. Thus, if the character-recognition technique tends to have particular errors when processing the financial information for a given user, the corresponding weights may be low, while the weights associated with other operations (and, thus, other potential errors) may be larger.

In some embodiments of process 200, there may be additional or fewer operations. Moreover, the order of the operations may be changed, and/or two or more operations may be combined into a single operation.

Figure 3:
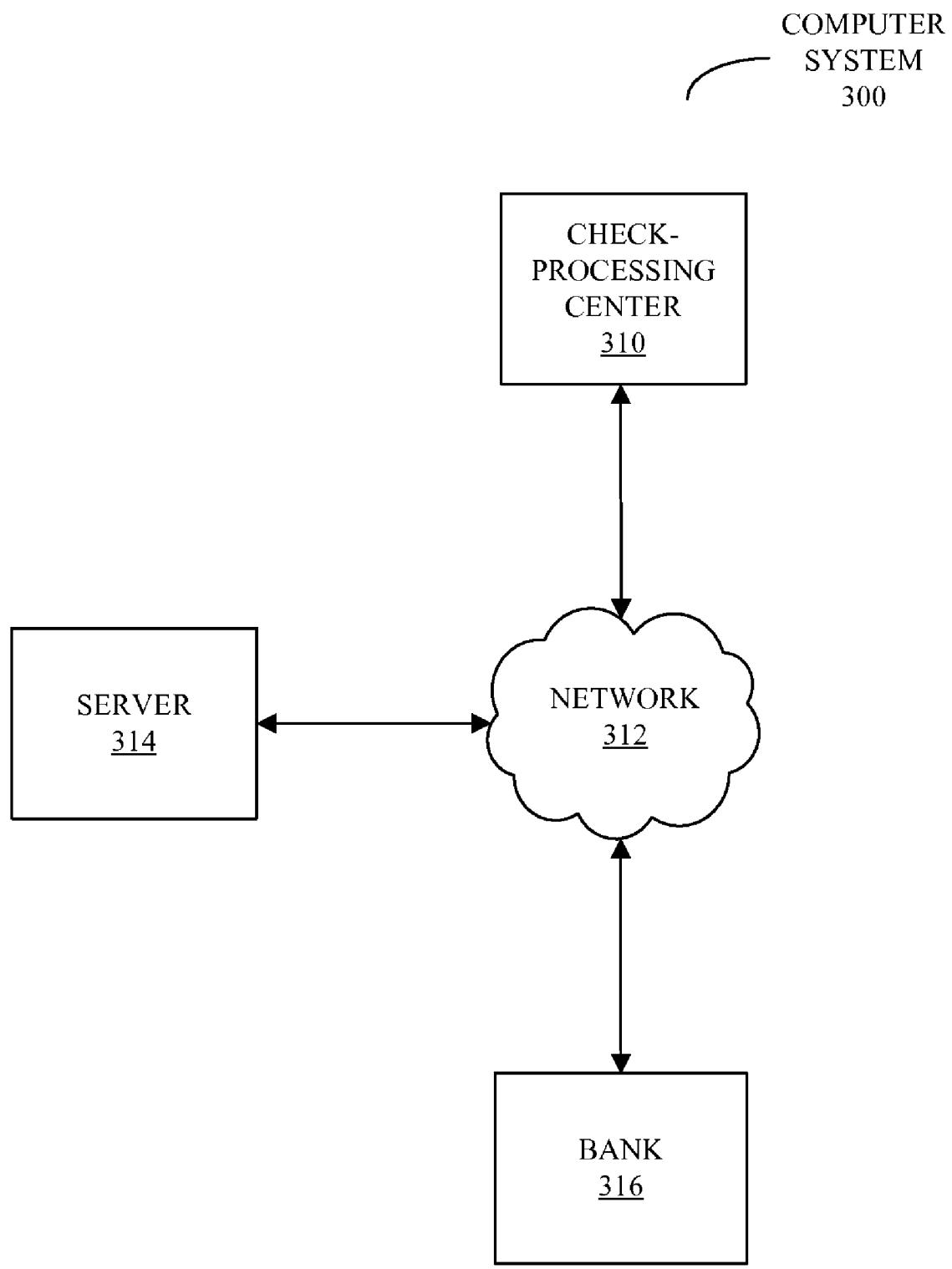
FIG. 3 is a block diagram illustrating a networked computer system that corrects errors in financial information in accordance with an embodiment of the present invention.

We now describe embodiments of a computer system that performs process 200. FIG. 3 presents a block diagram illustrating a networked computer system 300 that corrects errors in financial information. In this computer system, check-processing center 310 receives checks or scanned images of checks from multiple users. Next, the financial information on these checks (or check images) may be converted into digital format using character-recognition software. This character-recognition software may be resident on a computer at check-processing center 310, and the financial information may be provided to server 314 via network 312. Alternatively, scanned images of the checks may be communicated via network 312 to server 314, which converts the financial information into digital format using character-recognition software that executes on server 314.

Then, server 314 may identify and correct potential errors in the financial information using process 200 (FIG. 2). In particular, error-analysis software that resides and executes on server 314 may access expected financial information for a user. For example, the expected financial information may be included in a financial history, such as user-account records on a server belonging to a bank 316 (or, more generally, a financial institution), which is provided to server 314 via network 312. Alternatively or additionally, the expected financial information may be included in a financial history that is associated with financial software, and which is stored on server 314.

Using the expected financial information, the error-analysis software may determine the aggregate error metrics, and may correct those errors associated with an aggregate error metric having an extremum value. Then, the corrected financial information for the user may be provided to other computers or servers in computer system 300 for subsequent processing. For example, the user's account balance in the user-records of bank 316 may be updated based on the corrected financial information (e.g., a payment to a vendor may be subtracted from the user's account balance).

In some embodiments, an operator of computer system 300 provides feedback on the accuracy and effectiveness of the error-analysis software. For example, the operator may determine if all errors in the financial information were identified and corrected. Based on this feedback, the error-analysis software may adjust the weights associated with different potential errors to improve the processing of financial information associated with subsequent financial transactions of this user and/or multiple users.

In general, information, such as the expected financial information for one or more users, may be stored at one or more other locations in computer system 300 (i.e., locally or remotely). Moreover, because this information, as well as the financial information, may be sensitive information, it may be encrypted. For example, stored information and/or information communicated via network 312 may be encrypted.

Computers and servers in computer system 300 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 312 may include: the Internet, World Wide Web (WWW), an intranet, LAN, WAN, MAN, or a combination of networks, or other technology enabling communication between computing systems.

In exemplary embodiments, the financial software includes software such as: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

Figure 4:
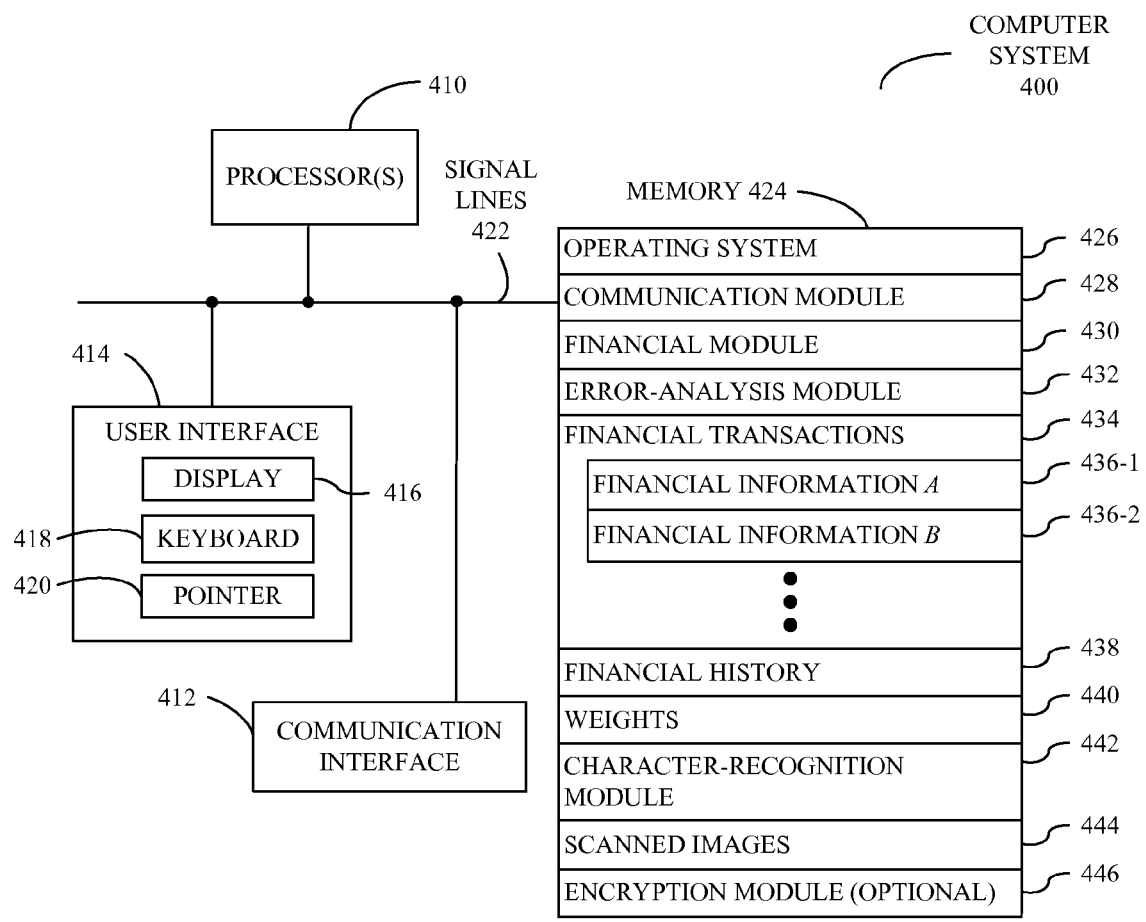
FIG. 4 is a block diagram illustrating a computer system that corrects errors in financial information in accordance with an embodiment of the present invention.

FIG. 4 presents a block diagram illustrating a computer system 400 that corrects errors in financial information. Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to the computer system 400.

Memory 424 may also include multiple program modules (or a set of instructions), including: financial module 430 (or a set of instructions), error-analysis module 432 (or a set of instructions), character-recognition module 442 (or a set of instructions), and/or optional encryption module 446 (or a set of instructions). Character-recognition module 442 may convert financial information on scanned images 444 (such as images of negotiable instruments) into digital format, which is stored in financial transactions 434. For example, financial transactions 434 may include financial information A 436-1 for a user and financial information B 436-2 for another user.

Then, error-analysis module 432 accesses expected financial information for a user associated with one of the financial transactions 434, such as financial information A 436-1. This expected financial information may be stored in financial history 438 and may be associated with financial module 430.

Next, error-analysis module 432 may determine potential errors in financial information A 436-1 by comparing financial information A 436-1 with the expected financial information and aggregating one or more error metrics (such as Levenshtein edit distances) for the potential errors. These error metrics may be determined using weights 440 for different error operations. Moreover, error-analysis module 432 may correct one or more potential errors in financial information A 436-1 based on one or more aggregate error metrics, such as one or more potential errors associated with a minimum value of the Levenshtein edit distance or a range of values of the Levenshtein edit distance.

Note that weights 440 may be determined by error-analysis module 432 based on the accuracy of the potential-error identification and correction for one or more users and/or the weights may be predetermined. For example, the weights may be associated with the characteristic errors of character-recognition module 442.

In some embodiments, at least some of the information stored in memory 424 and/or at least some of the information communicated using communication module 428 is encrypted using optional encryption module 446.

Instructions in the various modules in the memory 424 may be implemented in: a high-level procedural language, an object-oriented programming language, and/or in an assembly or machine language. Note that the programming language may be compiled or interpreted, e.g., configurable or configured to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computer systems 300 (FIG. 3) and/or 400 may include fewer components or additional components. Moreover, two or more components may be combined into a single component, and/or a position of one or more components may be changed. In some embodiments, the functionality of the computer system 400 may be implemented more in hardware and less in software, or less in hardware and more in software, as is known in the art.

Figure 5:
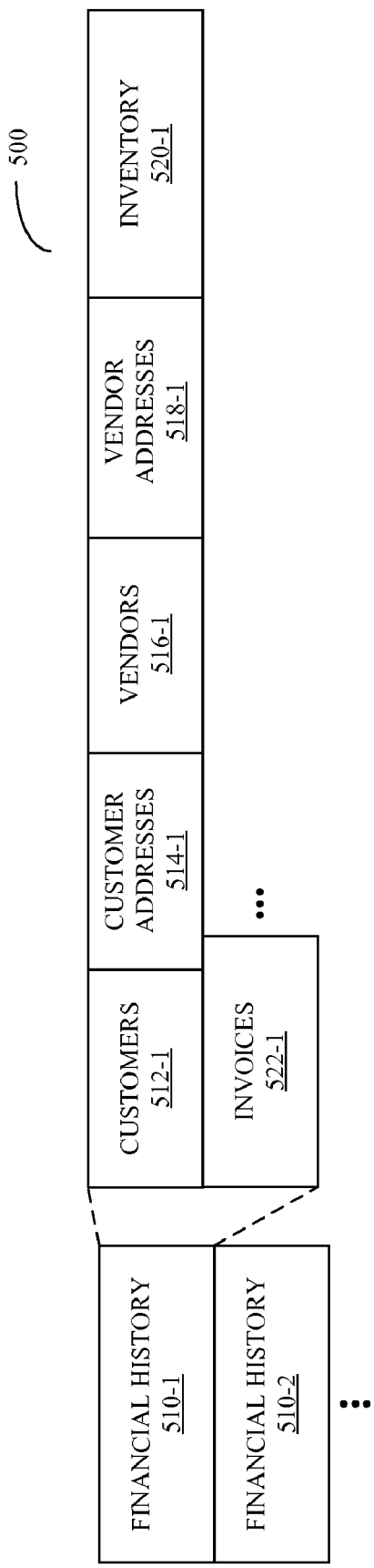
FIG. 5 is a block diagram illustrating a data structure in accordance with an embodiment of the present invention.

We now discuss data structures that may be used in computer system 300 (FIG. 3) and/or 400. FIG. 5 presents a block diagram illustrating a data structure 500. This data structure may include financial histories 510 for one or more users. For example, financial history 510-1 for a user may include: customers 512-1, customer addresses 514-1, vendors 516-1, vendor addresses 518-1, inventory 520-1, and invoices 522-1 of the user.

Figure 6:
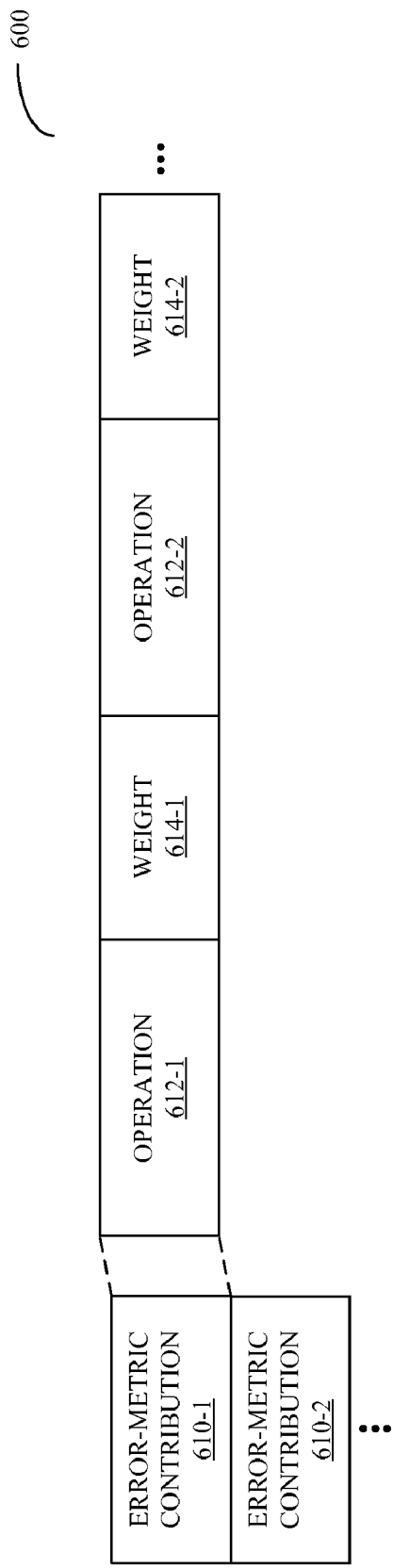
FIG. 6 is a block diagram illustrating a data structure in accordance with an embodiment of the present invention.

FIG. 6 presents a block diagram illustrating a data structure 600. This data structure may include error-metric contributions 610 for one or more character-recognition techniques that are used to determine aggregate error metrics. For example, error-metric contributions 610-1 may include multiple pairs of operations 612 and associated weights 614.

Note that in some embodiments of the data structures 500 (FIG. 5) and/or 600 there may be fewer or additional components. Moreover, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for correcting errors in financial information, comprising:
    receiving financial information associated with a financial transaction, wherein the financial information was previously extracted using character-recognition software;
    retrieving expected financial information for a user associated with the financial transaction;
    identifying potential errors in the received financial information by comparing the received financial information with the expected financial information and aggregating error metrics for the potential errors; and
    correcting the received financial information based on an aggregate error metric corresponding to one or more potential errors in the received financial information.

2. The method of claim 1, wherein the expected financial information includes a financial history of the user.

3. The method of claim 2, wherein the financial history is associated with financial software.

4. The method of claim 2, wherein the expected financial information includes a list of customers, customer addresses, a list of vendors, vendor addresses, an inventory, or invoices of the user.

5. The method of claim 1, wherein the character-recognition software includes optical character-recognition software.

6. The method of claim 1, wherein the character-recognition software includes intelligent character-recognition software.

7. The method of claim 1, wherein the financial transaction is associated with a negotiable instrument.

8. The method of claim 7, wherein the negotiable instrument includes a check.

9. The method of claim 1, wherein a given aggregate error metric includes a Levenshtein edit distance between characters in the received financial information and characters in the expected financial information.

10. The method of claim 9, wherein the aggregate error metric corresponding to the one or more potential errors has an extremum value of the aggregated error metrics.

11. The method of claim 9, wherein different weights are used for different potential errors when determining the given aggregate error metric.

12. The method of claim 9, wherein the different potential errors are associated with different operations.

13. The method of claim 12, wherein the different operations include character insertion, character deletion, character substitution, or character transposition.

14. The method of claim 1, further comprising receiving feedback regarding the corrected financial information; and modifying the determining of potential errors in subsequent received financial information based on the feedback.

15. A computer-program product for use in conjunction with a computer system, the computer-program product comprising a computer-readable storage medium and a computer-program mechanism embedded therein for configuring the computer system for correcting errors in financial information, the computer-program mechanism including:
    instructions for receiving financial information associated with a financial transaction, wherein the financial information was previously extracted using character-recognition software;
    instructions for retrieving expected financial information for a user associated with the financial transaction;
    instructions for identifying potential errors in the received financial information by comparing the received financial information with the expected financial information and aggregating error metrics for the potential errors; and
    instructions for correcting the received financial information based on an aggregate error metric corresponding to one or more potential errors in the received financial information.

16. The computer-program product of claim 15, wherein the expected financial information includes a financial history of the user.

17. The computer-program product of claim 16, wherein the financial history is associated with financial software.

18. The computer-program product of claim 15, wherein the character-recognition software includes optical character-recognition software.

19. The computer-program product of claim 15, wherein the character-recognition software includes intelligent character-recognition software.

20. The computer-program product of claim 15, wherein a given aggregate error metric includes a Levenshtein edit distance between characters in the received financial information and characters in the expected financial information.

21. A computer system, comprising:
    a processor;
    memory;
    a program module, wherein the program module is stored in the memory and configured to be executed by the processor, the program module including instructions for correcting errors in financial information, wherein the instructions include:
        instructions for receiving financial information associated with a financial transaction, wherein the financial information was previously extracted using character-recognition software;
        instructions for retrieving expected financial information for a user associated with the financial transaction;
        instructions for identifying potential errors in the received financial information by comparing the received financial information with the expected financial information and aggregating error metrics for the potential errors; and
        instructions for correcting the received financial information based on an aggregate error metric corresponding to one or more potential errors in the received financial information.

* * * * *